Oct. 19, 1937.  H. W. PITT  2,096,308
AUTOMATIC LUBRICATION OF MOTOR VEHICLES
Filed Nov. 21, 1935  2 Sheets-Sheet 1
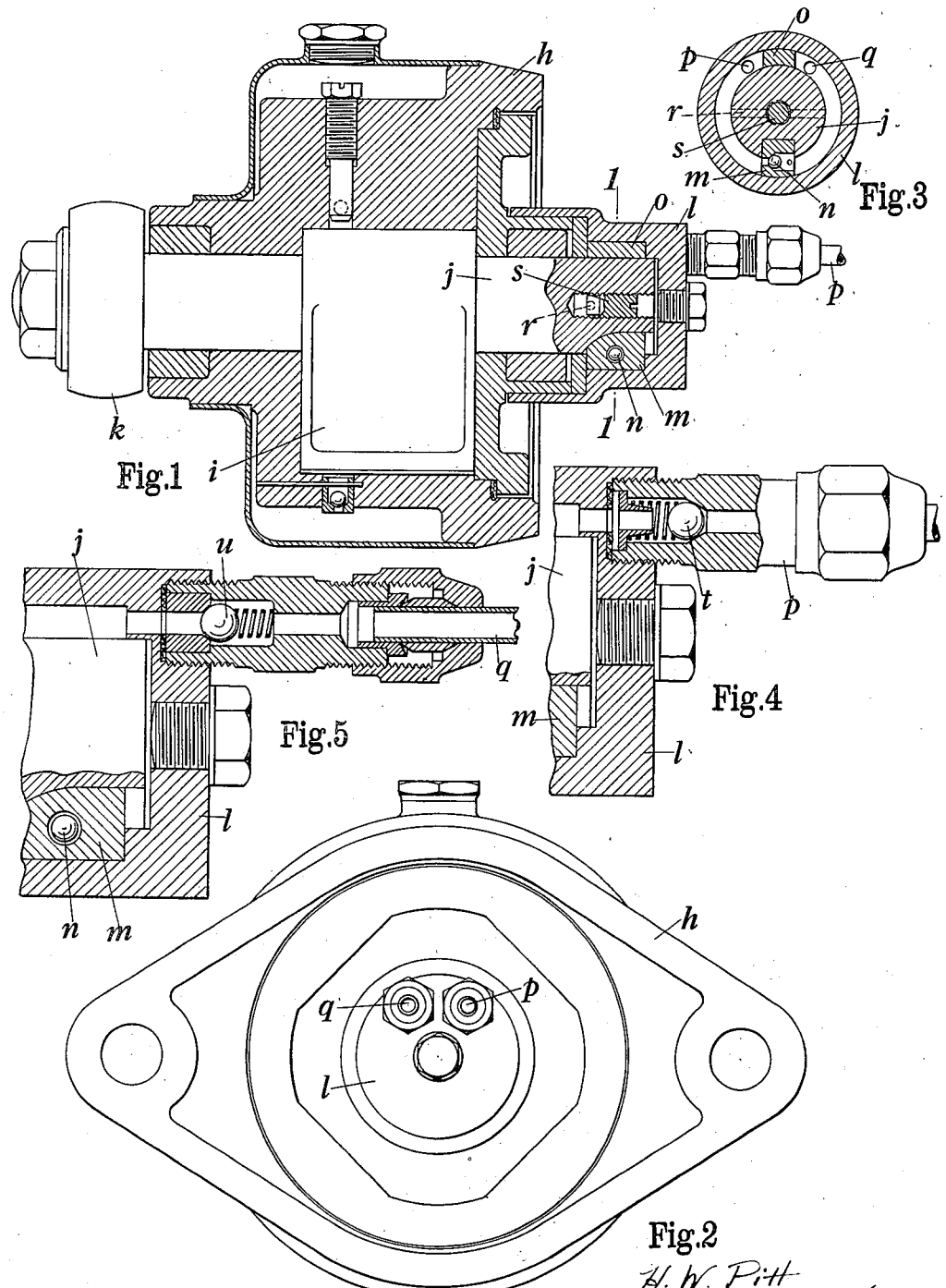

Patented Oct. 19, 1937

2,096,308

UNITED STATES PATENT OFFICE 2,096,308

AUTOMATIC LUBRICATION OF MOTOR VEHICLES

Herbert Winchester Pitt, Birmingham, England, assignor to Joseph Lucas Limited, Birmingham, England Application November 21, 1935, Serial No. 50,963
In Great Britain March 20, 1935

5 Claims. (Cl. 184—27)

This invention relates to the automatic or so-called central lubrication systems of motor vehicles by which lubricant is supplied to such parts as spring shackles, brake lever bearings and the like.

The object of the present invention is to provide improved means for effecting intermittent and automatic distribution of lubricant from a reservoir to the parts required to be lubricated.

The invention comprises a pump which is dependent for its action on relative movements between the chassis of the vehicle and one of the road wheels.

In particular the invention comprises a pump which is dependent for its action on the movement of a fluid controlled shock absorber.

In the two sheets of explanatory drawings:—

Figure 1 is a sectional elevation of a combined shock absorber and lubricating pump constructed in accordance with this invention and Figure 2 is a rear elevation.

Figure 3 is a cross section through the pump on the line 1—1 Figure 1.

Figures 4 and 5 are respectively sectional elevations illustrating to a larger scale than Figures 1–3 the parts associated with the inlet and outlet connections of the pump.

Figure 6:
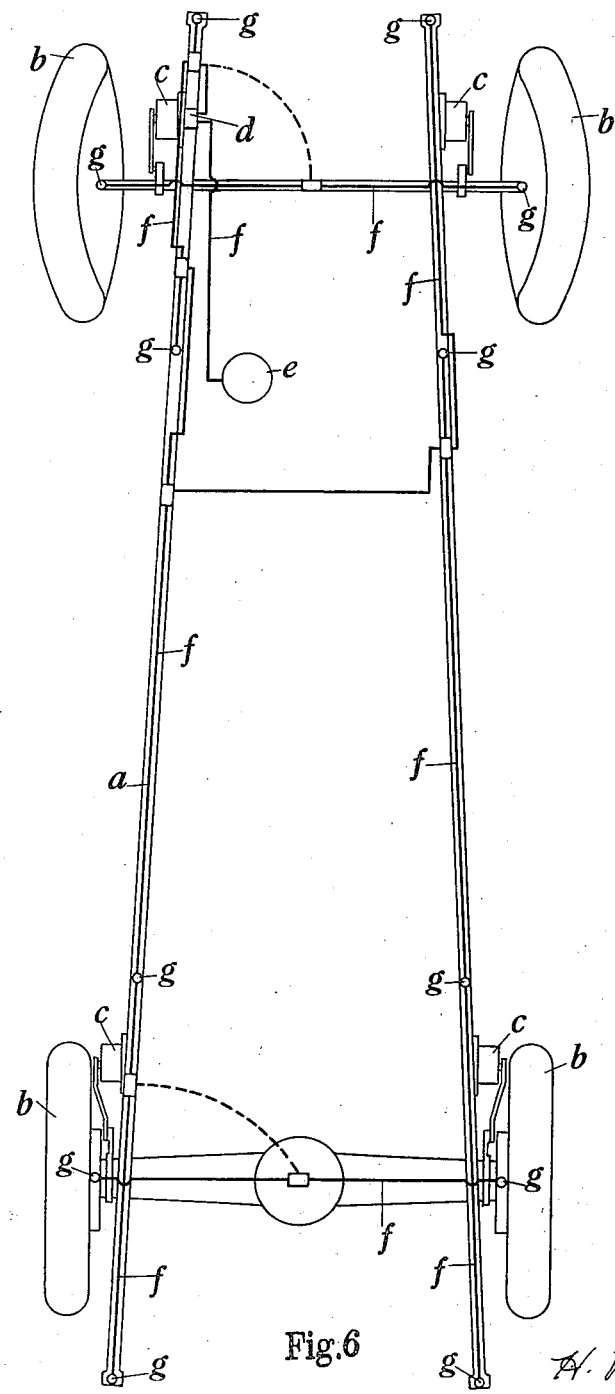
Figure 6 is a diagrammatic view illustrating a motor vehicle "central lubrication" system provided with this invention.

Referring to Figure 6, there is indicated diagrammatically in this figure a motor vehicle chassis $a$ having four road wheels $b$. The road wheels are connected to the chassis through any convenient and usual arrangement of springs. In combination with each road wheel is a hydraulically controlled shock absorber $c$, and in combination with one of the shock absorbers is arranged a lubricating pump $d$. This latter draws oil from a reservoir $e$ and delivers it along flexible or rigid pipes $f$ to the various points $g$ to be lubricated, which points may be the usual spring shackles, brake lever bearings and like parts.

According to one form of my invention I combine the pump with a shock absorber in the manner shown in Figures 1–5. The shock absorber comprises a hollow body part $h$ adapted to be attached to, for example, the chassis, and an oscillatory vane $i$, the spindle $j$ of which is connected by a lever $k$ to, for example, the adjacent road wheel axle. This shock absorber is of a known kind and its details form no part of the present invention. The vane $i$ is situated in the interior of the hollow body part.

The portion of the spindle $j$ extending from one side of the part $i$, is contained within a pump chamber $l$ secured to the body part $h$, and the said portion of the spindle is adapted to serve as the moving part of an oscillatory pump. On referring to Figures 1 and 3 it will be seen that the spindle $j$ is provided with a radial vane $m$ which co-operates with the inner surface of the chamber $l$ and contains a valve $n$ which allows oil to pass from one side of the said vane $m$ to the other. Also in the chamber $l$ is arranged a fixed radial abutment $o$ which bears against one side of the spindle and divides the chamber $l$ into two parts. On one side of the part $o$ is arranged an oil inlet $p$ and on the other an outlet $q$. Within the spindle is formed a transverse by-pass hole $r$ which interconnects the two parts of the chamber and this by-pass is controlled by an adjustable plug $s$. Oscillation of the spindle causes oil to be drawn in at one side and discharged from the other, the flow from one part of the oil chamber to the other being mainly past the valve $n$. The amount of oil delivered in each action of the spindle can be regulated by adjusting the plug $s$.

On reference to Figures 4 and 5 it will be seen that the inlet connection is provided with a non-return valve $t$ and the outlet is provided with a non-return valve $u$.

When the vehicle is in motion, relative movements between the road wheels and the chassis due to unevenness in the road surface, brings the shock absorbers in action in the usual well known manner, and according to my invention the actuation of one of the shock absorbers is accompanied by actuation of the lubricating pump above described which draws oil from the reservoir $e$ and delivers it to the various points $g$. If desired a pump may be combined with more than one of the shock absorbers, and the parts $g$ to be lubricated may be combined in groups which are supplied by the different pumps.

Having thus described my invention what I claim as new and desire to secure by Letters Patent is: —

1. In means for effecting automatic lubrication of the parts of motor vehicles, the combination with a fluid controlled shock absorber having a body part and a relatively movable member contained in the body part, of an oil pump having a body part on the body part of the shock absorber, and an inner relatively movable part rigid with the movable member of the shock absorber, substantially as described.

2. In means for effecting automatic lubrication of the parts of motor vehicles, the combination of a hollow cylindrical body part and an oscillatory vane forming the main parts of a fluid controlled shock absorber, an oil pump body part on the body part of the shock absorber, and a movable pump member rigid with the vane of the shock absorber, substantially as described.

3. In means for effecting automatic lubrication of the parts of motor vehicles, the combination of a hollow cylindrical body part of a fluid controlled shock absorber, an oscillatory vane in the said body part, a spindle supporting the vane in the body part, an operating lever on one end of the spindle, a hollow cylindrical oil pump body part on one side of the shock absorber body part, an oscillatory pump member formed in part by the other end of the said spindle, a radial projection from the said end of the spindle, a valve in the said projection, a radial projection in the oil pump body part cooperating with the spindle, and inlet and outlet connections on opposite sides of this latter projection, substantially as described.

4. In means for effecting automatic lubrication of the parts of motor vehicles, the combination of a hollow cylindrical body part of a fluid controlled shock absorber, an oscillatory vane in the said body part, a spindle supporting the vane in the body part, an operating lever on one end of the spindle, a hollow cylindrical oil pump body part on one side of the shock absorber body part, an oscillatory pump member formed in part by the other end of the said spindle, a radial projection from the said end of the spindle, a valve in the said projection, a radial projection in the oil pump body part cooperating with the spindle, inlet and outlet connections on opposite sides of this latter projection, and pump regulating means on the spindle, substantially as described.

5. In means for effecting automatic lubrication of parts of motor vehicles, the combination of a hollow cylindrical body part and an oscillatory vane forming the main parts of a fluid controlled shock absorber, a hollow cylindrical oil pump body part in direct association with the body part of the shock absorber, and an oscillatory pump member comprising an extension of the spindle of the shock absorber vane, substantially as described.

HERBERT WINCHESTER PITT.